United States Patent [19]
Bokstijn

[11] Patent Number: 5,632,539
[45] Date of Patent: May 27, 1997

[54] STORAGE DEVICE

[75] Inventor: Tom Bokstijn, Volendam, Netherlands

[73] Assignee: Tombo Trading Internaitonal B.V., Volendam, Netherlands

[21] Appl. No.: 474,255

[22] Filed: Jun. 7, 1995

Related U.S. Application Data

[63] Continuation-in-part of Ser. No. 189,327, Jan. 31, 1994, Pat. No. 5,445,449, which is a continuation-in-part of Ser. No. 859,404, May 27, 1992, abandoned.

[51] Int. Cl.$^6$ .................................................. A47B 81/06
[52] U.S. Cl. ............................................. 312/9.35; 312/297
[58] Field of Search .................................... 312/297, 9.29, 312/9.3, 9.31, 9.34, 9.35, 9.36, 9.58, 285

[56] References Cited

U.S. PATENT DOCUMENTS

| | | | |
|---|---|---|---|
| 4,717,091 | 1/1988 | Ackeret | 312/9.34 |
| 4,753,343 | 6/1988 | Flynn | 312/297 |
| 5,205,624 | 4/1993 | Martell et al. | 312/1 |
| 5,445,449 | 8/1995 | Bokstijn | 312/9.31 |

Primary Examiner—Peter M. Cuomo
Assistant Examiner—Gerald A. Anderson
Attorney, Agent, or Firm—Bachman & Lapointe, P.C.

[57] ABSTRACT

A storage device for thin, flat objects, includes a housing for supporting the device on a support surface, a stationary magazine mounted in the housing, the stationary magazine having a plurality of parallelly oriented storage spaces, a wall structure for retaining the objects in the storage spaces, the wall structure including a wall having an opening, the wall being at least partially slidable relative to the storage spaces so as to selectively align the opening with a desired storage space for insertion and removal of an object, and a removal assembly attached to the wall for removing objects from the storage spaces through the opening.

18 Claims, 4 Drawing Sheets

STORAGE DEVICE

CROSS REFERENCE TO RELATED APPLICATIONS

This application is a Continuation-In-Part of U.S. patent application No. 08/189,327 filed Jan. 31, 1994, now U.S. Pat. No. 5,445,449 which was a Continuation-In-Part of U.S. patent application No. 07/859,404, filed May 27, 1992, now abandoned.

BACKGROUND OF THE INVENTION

The present invention relates to a storage device for thin, flat objects, such as compact discs, comprising a stationary magazine with storage spaces extending along the outer periphery essentially at right angles thereto towards the center thereof, and provided with means for retaining said objects, at least at one side bounded by an at least partially rotatable or slidable wall. Alternatively, the stationary magazine may have a plurality of storage spaces arranged substantially parallel to each other in a row, or in various other configurations.

EP-A-0,263,496 discloses a magazine of a player in which the compact discs are placed in a circular manner. Opposite-lying compact discs are spaced apart at such a distance that a conveyor can move between them. This conveyor comprises a cylindrical element in which the compact discs can be inserted or out of which they can be slid. This conveyor element can be brought through rotation in front of the compact disc concerned, and the latter can be picked up therein and conveyed further to the player. Such a magazine is very complex and expensive to produce, and can be used properly only in conjunction with a fully automated playing system. Such a device cannot be used in practice merely for storing compact discs.

The object of the present invention is to provide a storage device for objects which can be achieved much more simply and therefore can also be put on the market solely as a magazine.

SUMMARY OF THE INVENTION

This object is achieved in the case of a storage device of the type described above in that the at least partially rotatable or slidable wall has an opening, which is to be brought into line with the storage spaces for the insertion and removal of said objects, and in that removal means acting upon the side of the objects opposite the side thereof adjoining said opening are connected to the rotatable or slidable wall.

Unlike the state of the art, the compact disc is now not removed towards the center of the magazine, but is moved at right angles to this plane. Such a device is particularly simple to produce, because only a stationary magazine is necessary, with only one outer wall provided with an opening which can be taken into different positions to release the different objects. The opening in this case can be so large that it is possible to place the fingers in it in order to be able to take hold of the objects. This does, however, have the disadvantage that dust and the like can enter the magazine as a result. For that reason, according to a further embodiment, provision is made for removal means which comprise a rod system connected to the rotatable or slidable wall, the engaging end of which system must be taken opposite the opening of the rotatable wall. This means that it is adequate to have an opening which corresponds to the dimensions of the object which is to be stored. If this object has to be taken out, it can be brought out partially by operating the removal means, to such an extent that the object can be gripped further by hand.

In order to operate the removal means for bringing out the objects, the removal means can be fitted near the rotatable or slidable wall. This makes it possible to operate both the rotatable or slidable wall and the removal devices with one hand.

In order to prevent the removal means from engaging in the space between two objects, in a preferred embodiment of the invention indexing means, permitting operation of the removal devices only in specific discrete positions, are provided.

For the facilitation of the accurate positioning of the opening, and in order to be in a position to remove the correct object immediately, in a preferred embodiment indicator means are present for determining the position of the rotatable or slidable wall relative to the remainder of the device.

According to a further advantageous embodiment, the storage spaces comprise a toothed part extending along the outer periphery of the storage device and a part lying coaxial thereto which lies therein and has the same number of teeth. Such teeth can be made particularly simply of strip material. Such a strip material is made in large quantities for all kinds of drive belts.

According to a still further advantageous embodiment, a linear housing is provided having a stationary magazine mounted in the housing, the magazine having a plurality of parallelly oriented storage spaces arranged substantially side-by-side. A wall structure is provided in accordance with this embodiment which includes a wall member which is at least partially slidable relative to the storage spaces of the stationary magazine. Removal means, indexing means and indicator means are likewise provided in accordance with the invention with this linear embodiment thereof.

BRIEF DESCRIPTION OF THE DRAWINGS

The invention will be explained in greater detail below with reference to examples of preferred embodiments of the invention shown in the drawings, in which.

DETAILED DESCRIPTION

Figure 1:
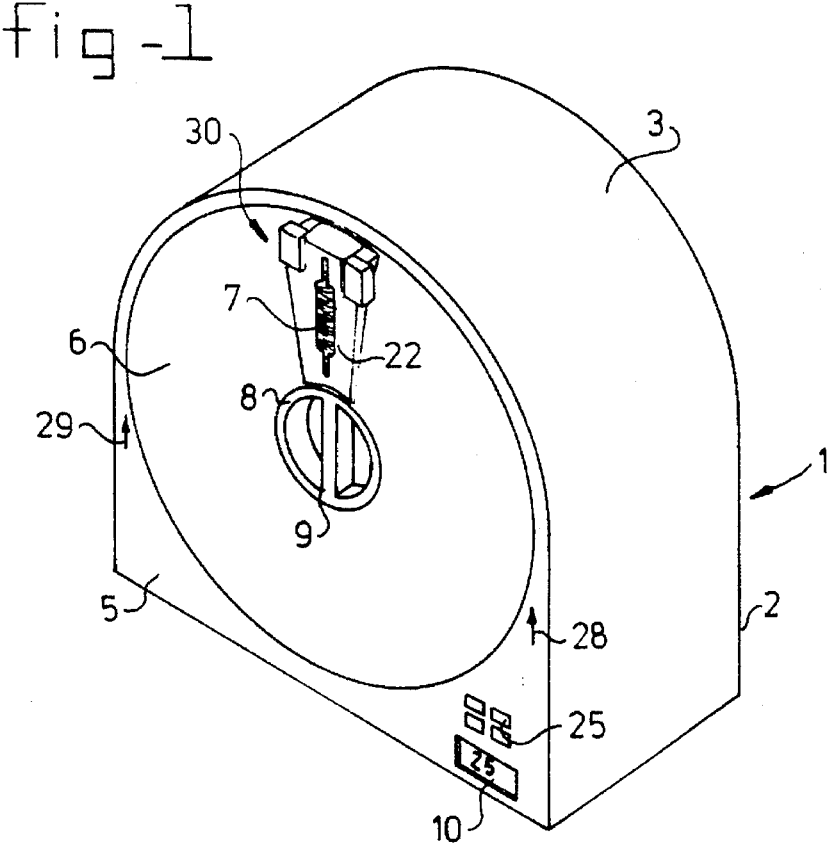
FIG. 1 shows a perspective external view of the device according to the invention.

The storage device according to the invention is shown in FIG. 1 and is indicated in its entirety by 1. It comprises a box-shaped body or housing 2 provided with a top/side wall 3, a rear and bottom wall (not shown), and a front wall 5. A rotatable wall part 6, provided with a slit-shaped opening 7 and a recess 8 over which a bridge 9 extends, is placed in the front wall 5. Wall part 6 is rotatable relative to front wall 5 through gripping bridge part 9 with the fingers. Of course, numerous other configurations are suitable for properly orienting wall 6. For example, a simple knob structure could be provided which would allow rotation of wall 6 as desired.

Said knob or ridge 9, it is noted, is preferably mounted on a shaft 21 journalled through wall 6. Rods 19, 20 are preferably attached to shaft 21, (see FIG. 2) so that rotation of wall 6 arranges rod 20 behind or adjacent to a desired storage space. Once properly located, pulling on knob 9 draws rod 20 into the selected storage space so as to eject a disc 15 stored therein through opening 7 of wall 6.

As shown, a numerical display 10 is also present. By means of transmission devices (discussed below) the position of the rotatable wall part 6 is displayed by the display means 10. It is possible to make this transmission either mechanical or electrical. A keyboard 25, by means of which the number or a brief designation of the desired stored object can be entered is also present. Illuminable arrow indicators are also provided in the front wall 5.

Figure 2:
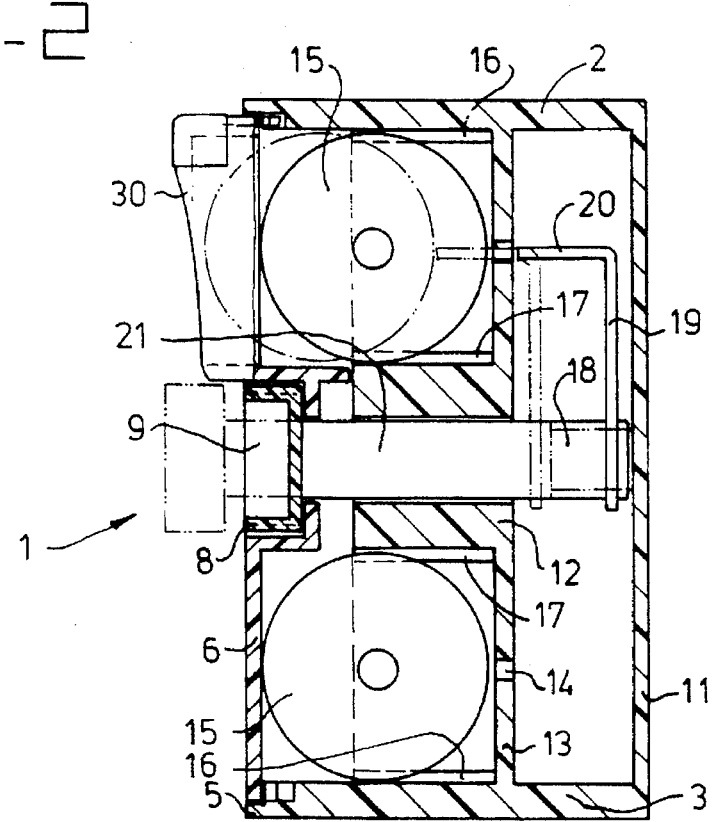
FIG. 2 shows a side view in cross-section of the device illustrated in FIG. 1.

FIG. 2 shows the device according to FIG. 1 in side view. The rear wall 11 is also shown here. It can be seen that a concentric ring or wall 12 connected to the rear wall 11 is present. The connection takes place by means of a plate 13 provided with perforations or openings 14. Wall 12 and plate 13 bound spaces for the storage of objects such as compact discs 15. These are held in place through the fact that teeth 16 are provided along the inside of the top/side wall 3. Teeth 17 are fitted on wall 12. The pitch of the various teeth is such here that an equal number of slits are bounded for accommodating compact discs 15. Such teeth can be achieved, for example, by fitting a strip material provided with teeth.

Figure 3:
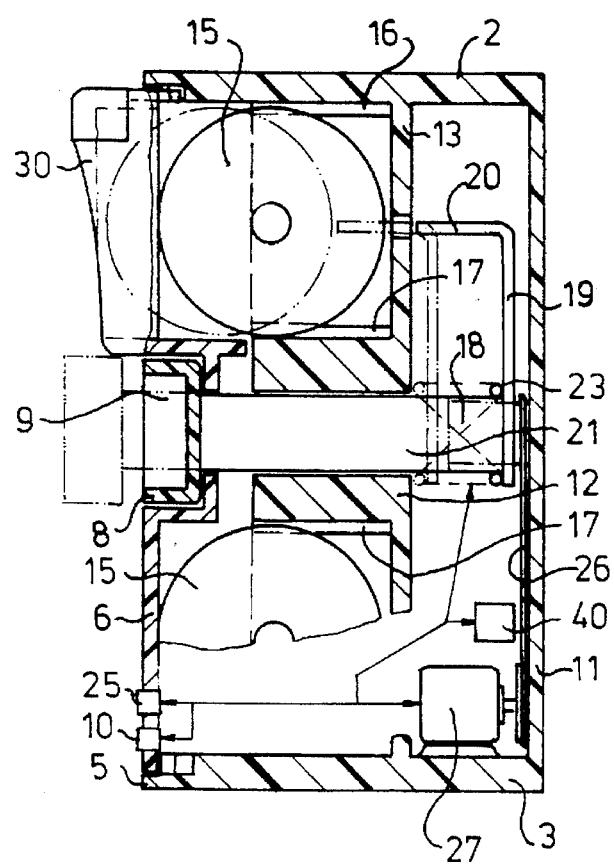
FIG. 3 shows a view corresponding to FIG. 2 of a further embodiment.

FIG. 2 also shows that recessed part 8, in which bridge part 9 is fitted, can be brought outwards relative to the rotatable wall part 6. In the non-use state this recessed part 8 is, however, moved inwards by a spring 23 (FIG. 3). A bush 18, provided with a rod system 19, 20, is connected to part 8. Moving part 8 outwards will cause part 20 to move to the left in FIG. 2. If part 20 is situated in front of an opening 14, it can go into the space for compact discs, as a result of which compact disc 15 in FIG. 2 is moved to the left and can be moved out of opening 7 in wall 6. This makes it possible to remove compact discs from the storage device in a particularly simple way. They can be inserted simply by pushing inwards. In order to prevent an excessively greater force from being exerted on rod 20 through the fact that it is not in front of an opening, bush 18 can be provided with teeth which mesh with corresponding teeth provided in the fixed part of the storage device, so that recessed part 8 can be moved outwards only in discrete positions. This indexing will be further described below. After the desired compact disc 15 is entered by means of keyboard 25, the direction in which bridge part 9 must be rotated will be indicated by arrow 28 or arrow 29 being illuminated.

FIG. 3 shows another embodiment of the invention. An electric motor 27 is provided here with the aid of a toothed belt or chain 26 which is connected to the rotary drum. After the desired compact disc is keyed in on keyboard 25, slit 7 will be placed in the correct way relative to the magazine by means of motor 27. In order to avoid the entry of dust, slit 7 can be provided with a dust seal, such as brush hairs 22 (see FIGS. 1 and 5).

Figure 4:
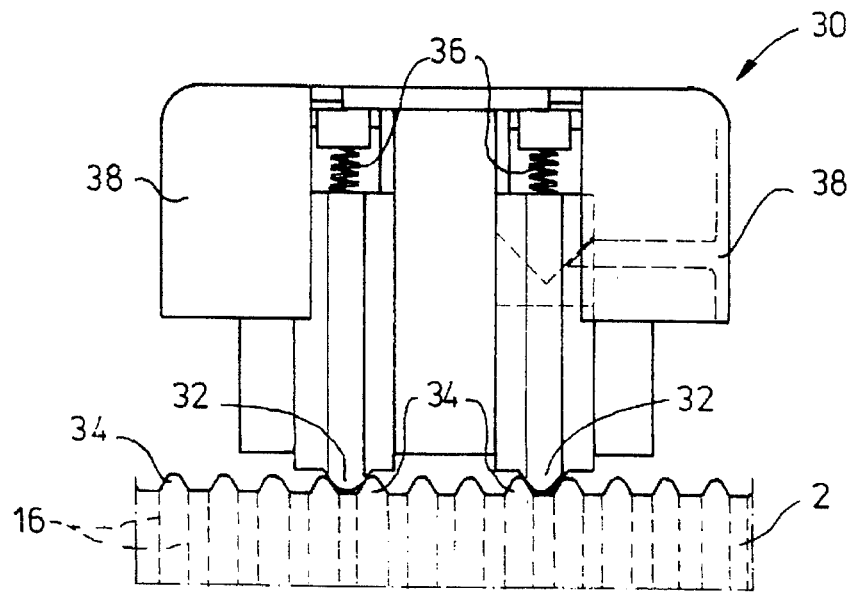
FIG. 4 shows an end view of the indexing structure of the invention.
Figure 5:
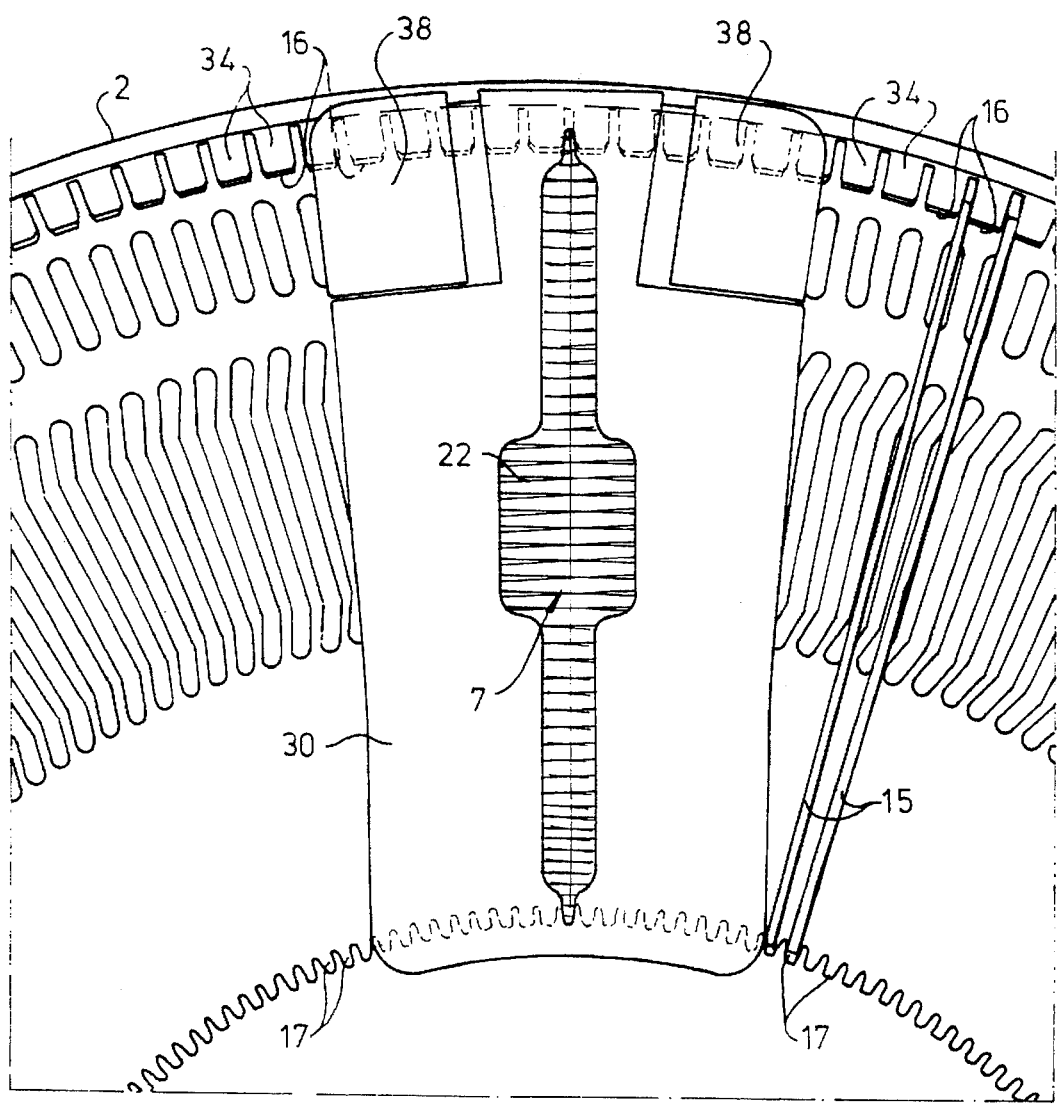
FIG. 5 shows a side view of a portion of the apparatus of the invention including the indexing structure.

As set forth above, a feature of the present invention is the indexing of wall 6 relative to housing 2 so that opening 7 is arranged opposite a desired storage space. In accordance with the invention, an indexing assembly 30 is provided. Assembly 30 serves to engage wall 6 relative to housing 2 only in positions where opening 7 is aligned with a storage space. FIGS. 4 and 5 show end and side views of assembly 30. Assembly 30 includes one or more teeth 32 slidably mounted for engagement with housing 2. Housing 2 may preferably be provided with a plurality of substantially laterally oriented teeth 34 which may suitably be aligned with or may be extensions of teeth 16. Teeth 32 are also preferably arranged on assembly 30 so that when they engage teeth 34, opening 7 is aligned with a storage space. In this regard, teeth 32, 34 preferably have bevelled or sloped sides, and teeth 32 may preferably be biased for example by springs 36 toward teeth 34. In this way, springs 36 will urge teeth 32 into engagement with teeth 34 and, thereby, will provide any slight radial adjustment of the position of wall 6 which may be necessary so that opening 7 will be aligned with a storage space at all times.

Assembly 30 may also include push member 38 which may be arranged for use in withdrawing teeth 32 so that wall 6 can be rotated to a new desired position. As before, upon release of push members 38, springs 36 engage teeth 32 with teeth 34 so as to ensure alignment of opening 7 with a selected storage space.

Push members 38 may be associated with teeth 32 through properly arranged cam surfaces 39 as shown in hidden lines in FIG. 4 so as to transmit squeezing of members 38 into withdrawal of teeth 32, as desired. Numerous other arrangements could of course be utilized.

As set forth above, storage spaces are defined by inwardly directed teeth 16 and outwardly directed teeth 17, positioned on or within housing 2. Teeth 16, 17 may be formed integrally on housing 2, or may be partially or entirely separate elements mounted to housing 2.

In accordance with the invention, teeth 16, 17 are preferably spaced so as to provide a space suitable for storing compact discs 15. It is noted, of course, that the spacing of teeth 16, 17 could also be selected so that storage spaces are suitable for cassettes, records, or numerous other thin substantially flat objects as desired.

The stationary nature of housing 2 provides a solid and reliable device while rotation or sliding of wall 6 provides a simple and effective means for accessing stored objects.

As set forth above, display 10 illustrates, for example numerically, the identity of the particular storage space with which opening 7 is aligned. The proper number is preferably illustrated by a transmission 40 which associates position of wall 6 with the appropriate identity or number. Transmission 40 (shown schematically in FIG. 3) may be mechanical or electrical in nature and may, for example, include an electrical storage device for associating a particular number with a particular position and vice versa.

Keypad 25, as set forth above, may also be included for entering the identity of a desired storage space. By means of transmission 40, the entered identity could be translated into a signal for operating one of arrows 28, 29 to advise the user which direction to turn or move wall 6. In the embodiment of FIG. 3, transmission 40 could be adapted to signal motor 27 to automatically rotate wall 6 and opening 7 to the desired storage space.

Figure 6:
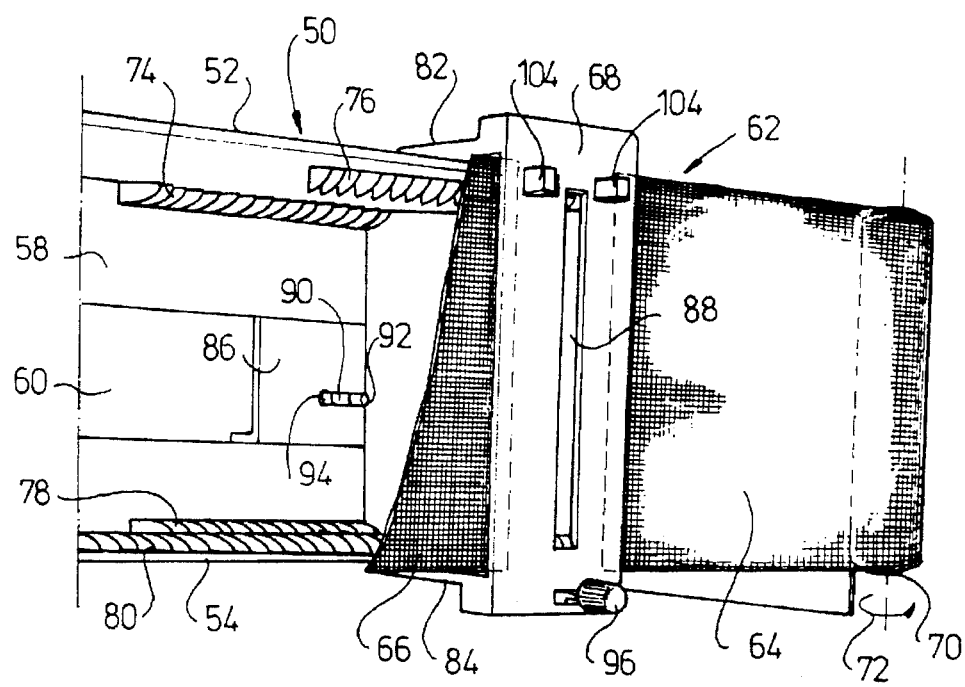
FIG. 6 shows a front perspective view of a device according to an alternate embodiment of the invention.
Figure 7:
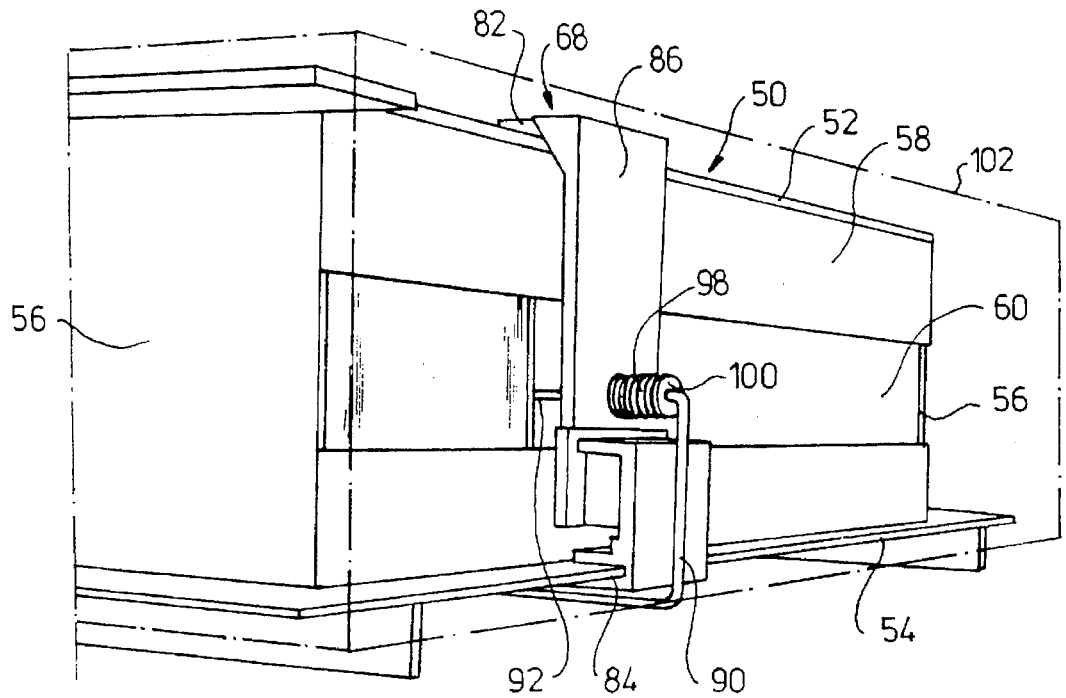
FIG. 7 shows a rear perspective view of the device of FIG. 6.

Referring now to FIGS. 6 and 7, a further embodiment of the invention is disclosed which incorporates elements similar or identical to elements of the embodiment described above. The storage device according to the embodiment of the invention shown in FIGS. 6 and 7 comprises a housing 50 provided with a top wall 52, a bottom wall 54 and two side walls 56. At the rear of the housing 50, a rear wall 58 is provided which has a relatively wide slit-shaped opening 60 extending between the side walls 56.

As shown in FIG. 6 a front wall 62 has been provided consisting of two flexible webs 64, 66. At one end, these webs 64, 66 are connected to a slide member 68. At their opposite ends, the webs 64, 66 are each wound onto a reel shown schematically at 70 which under the influence of a torsion spring illustrated schematically by arrow 72 holds the respective webs 64, 66 under tension.

At the inner sides of top wall 52 and bottom wall 54, rows of teeth 74, 76, 78, 80 are provided. Teeth 74, 76, 78, 80 are preferably substantially parallel to each other. Teeth 74, 76 may preferably be parallelly oriented or pointing toward teeth 78, 80 so as to define storage spaces for objects to be stored. Between each pair of teeth a flat object such as a compact disc, a flat box for such disc or for a tape, etc. can be accommodated.

Slide member 68 is slidably held with respect to the top wall 52, bottom wall 54 and back wall 58 by means of respectively upper bar 82 lower bar 84 and a rear bar 86. of course, slide member 68 may be slidably associated with housing 50 in numerous other ways as well. Furthermore, slide member 68 contains a slit-shaped opening 88, via which opening 88 the thin, flat objects accommodated in the spaces defined between the pairs of teeth 74, 76, 78, 80 can be removed.

For removal of an object, furthermore a push member 90 is provided. This push member 90 comprises an end 92 which extends through a hole 94 in rear bar 86 of slide member 68. Furthermore, push member 90 is provided with a knob 96 which is situated at the front side of slide member 68. By means of compression spring 98, which extends between rear bar 86 and a fixed washer 100, push member 90 is constantly urged towards the rear side.

The storage device according to this embodiment of the invention is operated as follows. Initially, the slide member 68 is slid or otherwise positioned along the housing 50, towards the location of the object to be removed from the housing 50. This means that the slit-shaped opening 88 in slide member 68 should be situated in a position which is aligned with the said object. Once this position has been reached, push member 90 is actuated by pulling knob 96, and thereby pushing the object through the slit-shaped opening 88 by means of the end 92 of push member 90. Subsequently, the object can be gripped for complete removal.

As the housing at its front side is permanently covered by means of the front wall 62 which consists of the flexible webs 64, 66 as well as slide member 68, the objects within housing 50 are always protected against dust, light, etc. Moreover, as shown schematically in FIG. 7, a protective cover 102 may be provided, which surrounds housing 50 at the top surface, rear surface, bottom surface and side surfaces. The flexible webs 64, 66 may extend up to the free edges of this cover 102 in such a way that a perfect sealing of the inner space of housing 50 is obtained.

Still referring to FIG. 6, it should be noted that slide member 68 may suitably be provided with an indexing assembly similar to that discussed above with reference to FIG. 4. Specifically, slide member 68 may suitably be provided with push members 104 for actuating teeth (see for example teeth 32 in FIG. 4) so as to engage same with laterally facing teeth such as with the embodiment described above with reference to FIG. 4. In the embodiment of FIG. 6, push members 104 may preferably engage teeth (not shown in FIG. 6) with, for example, the laterally or outwardly facing edges of teeth 76. Actuation of push members 104 would serve to disengage slide member 68 from teeth 76 by means of, for example, cam surfaces as shown in FIG. 4, so as to allow sliding of slide member 68 relative to housing 50 for the desired positioning slit 88 with reference to the spaces defined by teeth 74, 76, 77, 80.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A storage device for thin, flat objects, comprising:

housing means for supporting the device on a support surface;

a stationary magazine mounted in said housing, said stationary magazine having a plurality of parallelly oriented storage spaces;

wall means for retaining said objects in said storage spaces, said wall means including a wall having an opening, said wall means being at least partially slidable relative to said storage spaces so as to selectively align said opening with a desired storage space for insertion and removal of an object; and removal means attached to said wall for removing objects from said storage spaces through said opening, wherein said removal means comprises a rod system associated with said wall and having an engaging end for engaging and removing objects, said engaging end being aligned opposite to said opening of said wall and moveable with said wall whereby said engaging end is selectively aligned with said desired storage space.

2. A storage device according to claim 1, further including indicator means for identifying a storage space when said storage space is aligned with said opening.

3. A storage device according to claim 2, wherein said indicator means comprises transmission means for associating position of said wall relative to said housing with a storage space aligned with said opening, said indicator means being associated with said transmission means.

4. A storage device according to claim 1, wherein said magazine comprises a first plurality of parallel teeth and a second plurality of parallel teeth pointing towards the first plurality of parallel teeth, said first and second pluralities of teeth defining said storage spaces.

5. A storage device according to claim 1, wherein said storage spaces are arranged in a row.

6. A storage device according to claim 1, further comprising indexing means for selectively aligning said opening with a desired storage space.

7. A storage device according to claim 6, wherein said indexing means comprises at least one tooth member movably mounted relative to said storage spaces and movable between an engaged position wherein said opening is aligned with a storage space and said wall is held against sliding and a disengaged position wherein said wall is slidable relative to said housing to a desired location.

8. A storage device according to claim 7, wherein said indexing means is mounted to said wall and said tooth member engages with a storage space when in said engaged position.

9. A storage device according to claim 8, wherein said indexing means further includes biasing means for urging said tooth member toward said engaged position.

10. A storage device according to claim 7, wherein said housing further includes a plurality of substantially laterally oriented teeth and wherein said tooth member engages with said laterally oriented teeth when in said engaged position.

11. A storage device according to claim 10, wherein said laterally oriented teeth are aligned with said storage spaces whereby said tooth member, when in said engaged position, engages said wall so that said opening is aligned with a desired storage space.

12. A storage device according to claim 1, wherein said removal means further includes means for operating said removal means to remove an object from a storage space.

13. A storage device according to claim 1, wherein the wall further comprises a web of flexible material, which web is deflected at opposite ends of the stationary magazine.

14. A storage device according to claim 13, wherein the wall has two ends, and wherein each end is connected to a respective reel.

15. A storage device according to claim 14, wherein the wall comprises a slide member slidably mounted relative to the stationary magazine, and wherein the opening is positioned on the slide member.

16. A storage device according to claim 15, wherein the slide member is slidably guided with respect to the stationary magazine.

17. A storage device according to claim 16, wherein the slide member is connected to two webs of flexible material, each web being connected to a reel for tensioning the web.

18. A storage device according to claim 17, wherein the removal means are carried by the slide member.

* * * * *